(12) United States Patent
Uezono et al.

(10) Patent No.: US 7,075,634 B2
(45) Date of Patent: Jul. 11, 2006

(54) SURVEYING SYSTEM

(75) Inventors: Shinobu Uezono, Saitama (JP); Masami Shirai, Saitama (JP); Koji Tsuda, Saitama (JP); Atsumi Kaneko, Tokyo (JP); Ryota Ogawa, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/606,224

(22) Filed: Jun. 26, 2003

(65) Prior Publication Data
US 2004/0004706 A1   Jan. 8, 2004

(30) Foreign Application Priority Data
Jun. 28, 2002   (JP) .......................... P2002-190599

(51) Int. Cl.
  G01B 11/14   (2006.01)
  G01C 1/04    (2006.01)
  G01C 3/08    (2006.01)

(52) U.S. Cl. ................. 356/139.1; 356/4.05; 356/5.01

(58) Field of Classification Search ............... 356/4.01, 356/4.05, 5.01, 139.01, 139.1
See application file for complete search history.

(56) References Cited

U.S. PATENT DOCUMENTS

| 4,682,218 | A  | * | 7/1987  | Kaneko ...................... 348/116 |
| 6,034,722 | A  | * | 3/2000  | Viney et al. ................. 348/135 |
| 6,137,569 | A  | * | 10/2000 | Sasaki et al. ................ 356/153 |
| 6,144,761 | A  |   | 11/2000 | Kaneko et al. |
| 6,304,669 | B1 |   | 10/2001 | Kaneko et al. |
| 6,487,517 | B1 |   | 11/2002 | Sakai et al. |
| 6,563,574 | B1 | * | 5/2003  | Ohtomo et al. .......... 356/141.1 |
| 6,600,511 | B1 |   | 7/2003  | Kaneko et al. |
| 6,618,497 | B1 |   | 9/2003  | Nakayama |
| 6,618,498 | B1 |   | 9/2003  | Nakayama |
| 2003/0048355 | A1 | * | 3/2003 | Shimoyama et al. ......... 348/79 |

FOREIGN PATENT DOCUMENTS

| JP | 11325883 | 11/1999 |
| JP | 11337336 | 12/1999 |
| JP | 3261359  | 12/2001 |

OTHER PUBLICATIONS

English Language Abstract of JP 11-325833.
A portion of Sokkia Update, Jul. 2002, together with an English language translation.

* cited by examiner

Primary Examiner—Thomas H. Tarcza
Assistant Examiner—Isam Alsomiri
(74) Attorney, Agent, or Firm—Greenblum & Bernstein, P.L.C.

(57) ABSTRACT

An automatic surveying system is provided that comprises a surveying device, a collinear-line calculating processor, a sighting direction control processor, and an object-point searching processor. The collinear line calculating processor obtains a collinear line for an arbitrarily designated point on a schematic image of which the positional relation to the surveying device is known. The sighting direction control processor controls the surveying device to sight along the collinear line. The object point searching processor searches for an object point where the position of the object point can be determined as a point on the collinear line. This is executed by measuring the sighting direction with the surveying device while carrying out the sighting direction control process. Further, a position obtained by the object point searching processor coincides with an object point that corresponds to the designated point.

7 Claims, 12 Drawing Sheets

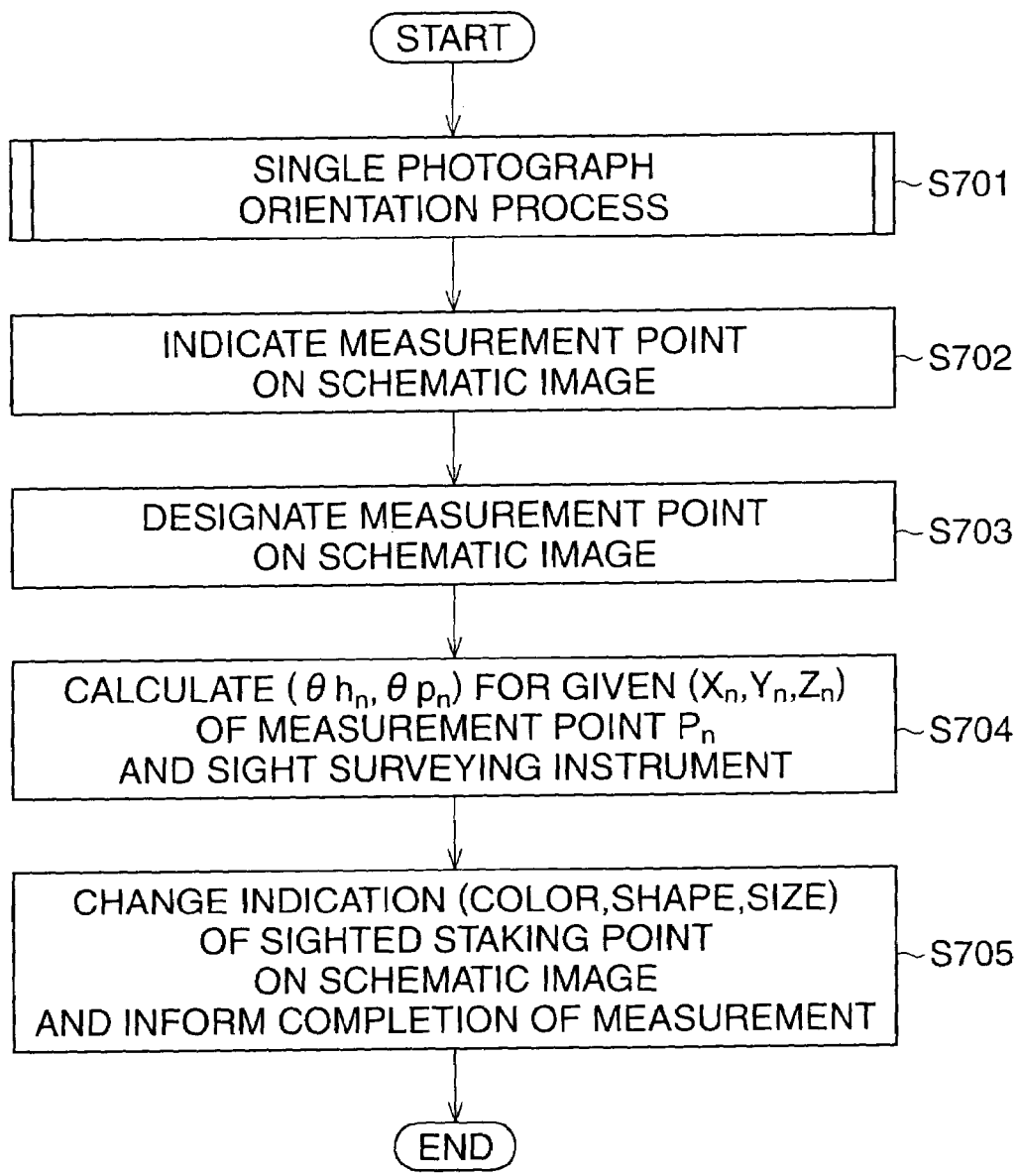

SURVEYING SYSTEM

BACKGROUND OF THE INVENTION

1. Field of the Invention

The present invention relates to a surveying system. In particular, it relates to a surveying instrument or system, including a total station, an electronic tacheometer, or the like, that is able to measure an angle and a distance relating to a measurement point.

2. Description of the Related Art

Generally, a surveying operation requires at least two persons. Namely, one holds a target, such as a prism or the like, at a measurement point, while the other person operates a surveying instrument. In the surveying operation, in order to obtain measurement data for a plurality of measurement points, the person with the target should move to each of the measurement points, and the other person should sight the surveying instrument to the target, each time the target moves to a measurement point. Therefore, the conventional surveying operation is quite cumbersome and requires at least two people and a lot of time, so it is inefficient and expensive. Recently, a non-prism-type surveying instrument, which requires no target, has been developed. With the non-prism-type surveying instrument, the person who carries the target can be excluded and the surveying can be carried out by a single person who operates the surveying instrument, so that the efficiency of the surveying operation is improved. However, even when using the non-prism-type surveying instrument, the operator should still carry out sighting operations for each of the measurement points. This becomes extremely cumbersome and requires time particularly when the number of measurement points is large, such as when estimating the volume of a basin or hollow ground to be buried.

SUMMARY OF THE INVENTION

Therefore, an object of the present invention is to improve efficiency of the surveying operation. More particularly, the invention aims to cooperate measurement information obtained by a surveying instrument and image information of a surveying area which is obtained by a camera, simply and efficiently, thereby improving efficiency.

According to the present invention, a surveying system is provided. The system comprises a surveying device, a collinear-line calculating processor, a sighting direction control processor, and an object-point searching processor.

The collinear-line calculating processor obtains a collinear line which provides a collinear condition for an arbitrarily designated point on a schematic image of which the positional relation to the surveying device is known. The sighting direction control processor controls the sighting direction of the surveying device to move along the collinear line. The object-point searching processor searches for an object point that can be determined as a point on the collinear line by measuring the sighting direction with the surveying device, while carrying out the sighting direction control procedure. Further, the position obtained by the object point searching processor coincides with an object point that corresponds to the designated point on the schematic image.

Further according to the present invention, an automatic surveying system is provided that comprises a position relation calculating processor, a correspondence establishing processor, an input device, and a sighting direction control processor.

The position relation calculating processor calculates a positional relation between a coordinate system to which measurement information of a measurement point refers and a schematic image of a surveying field, which includes the measurement point. The correspondence establishing processor establishes correspondence between measurement information of the measurement point and position information of a point corresponding to the measurement point on the schematic image with respect to the above positional relation. The input device enables a designation of a measurement point on the schematic image. The sighting direction control processor controls a sighting direction of a surveying device in accordance with the position of the designated measurement point on the schematic image, which is designated by using the input device.

BRIEF DESCRIPTION OF THE DRAWINGS

The objects and advantages of the present invention will be better understood from the following description, with reference to the accompanying drawings in which:

FIG. 13 is a flowchart of the surveying operation for an alternate embodiment.

DESCRIPTION OF THE PREFERRED EMBODIMENTS

Figure 1:
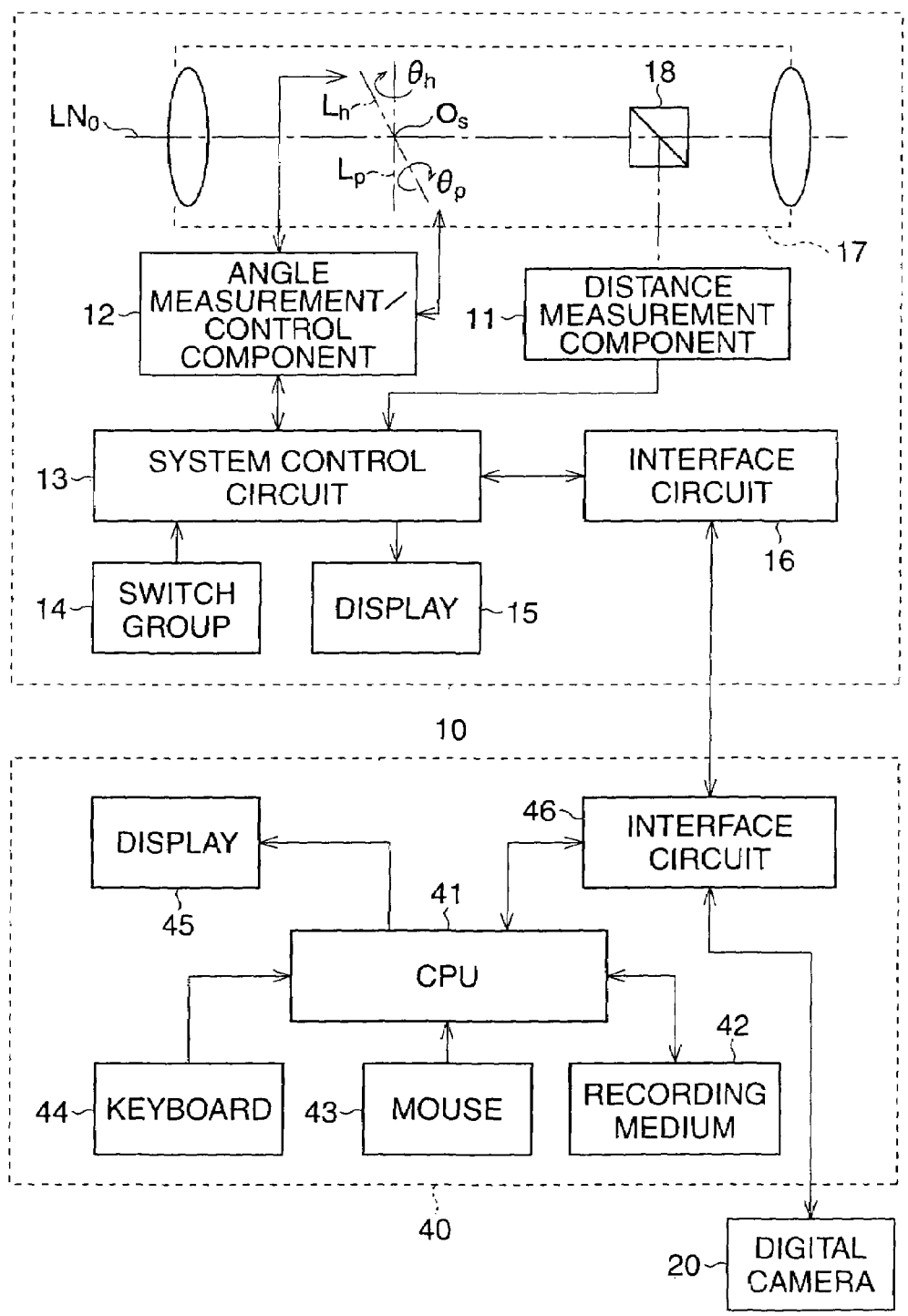
FIG. 1 is a block diagram showing a general electrical construction of a surveying system for an embodiment of the present invention.

The present invention is described below with reference to the embodiments shown in the drawings.

FIG. 1 is a block diagram showing a general electrical construction of an embodiment of the present invention, which includes a surveying instrument and a camera.

A surveying instrument 10 of the present embodiment may be a total station or the like that comprises a sighting telescope 17. The sighting telescope 17 has a horizontal axis Lh for measuring an altitude $\theta p$, and a vertical axis Lp for measuring a horizontal angle $\theta h$. Namely, the sighting telescope 17 is vertically rotatable about the horizontal axis Lh and horizontally rotatable about the vertical axis Lp. The horizontal axis Lh and the vertical axis Lp intersect at point $O_S$ (referred to as the sighting origin $O_S$ in the following) at a right angle. The optical axis $LN_O$ (or collimation axis) of the sighting telescope 17 passes through the sighting origin $O_S$. The optical axis $LN_O$ is bifurcated by a half-mirror 18, so that one of the bifurcated optical axes reaches the eyepiece lens and the other reaches the distance measurement component 11.

The distance measurement component 11 detects an oblique distance to a measurement point (which is sighted) by using a phase modulation measurement method, a pulse radar method, or the like, while an angle measurement/control component 12 detects a vertical angle θp and a horizontal angle θh. Further, the sighting telescope 17 can be rotated about each of the horizontal and vertical axes Lh and Lp by using an actuator (not shown), such as a stepping motor. This motor driven rotation of the sighting telescope 17 is controlled by the angle measurement/control component 12.

The distance measurement component 11 and the angle measurement/control component 12 are connected to a system control circuit 13, whereby they are controlled by signals from the system control circuit 13. For example, the distance measurement component 11 detects a distance in accordance with signals from the system control circuit 13, and outputs the detected data or measurement data to the system control circuit 13. On the other hand, the angle measurement/control component 12 continuously detects angles at a regular timing and outputs the detected data or measurement data to the system control circuit 13 when it is required. Further, the angle measurement/control component 12 controls the rotational movement of the sighting telescope 17 about the horizontal and vertical axes Lh and Lp by driving the stepping motor. The detected data, such as an oblique distance, horizontal angle, and vertical angle, are processed in the system control circuit 13. The system control circuit 13 is also connected to a switch group 14, a display 15 (ex. LCD), an interface circuit 16, and so on.

A computer 40, such as a notebook sized personal computer, may be connected to the interface circuit 16 through an interface cable. Namely, the surveying instrument 10 can transmit measurement data to the computer 40 via the interface cable. Further, the surveying instrument 10 can be controlled by control signals from the computer 40. For example, a sighting operation of the sighting telescope 17, to an arbitrary direction (horizontal angle θh and vertical angle θp), may be controlled by the computer 40. Note that, the interface circuit 16 is also available for other peripheral devices, such as a data collector, and the like, which are not shown.

The computer 40 is generally comprised of a CPU 41, a recording medium 42, input devices including a mouse 43 and a keyboard 44, a display (image indicating device) 45, and an interface circuit 46. Examples of the recording medium 42 are a hard disk, DVD, MO, and IC card. Further, the display 45 includes an LCD, CRT, and so on. As described above, the interface circuit 46 is connected to the interface circuit 16 of the surveying instrument 10 via the interface. Further, the interface circuit 46 can be connected to a digital still camera 20. Namely, an image captured by the digital still camera 20 is transmitted to the computer 40 as digital image data and stored in the recording medium 42 via the interface circuit 46, for example.

Figure 2:
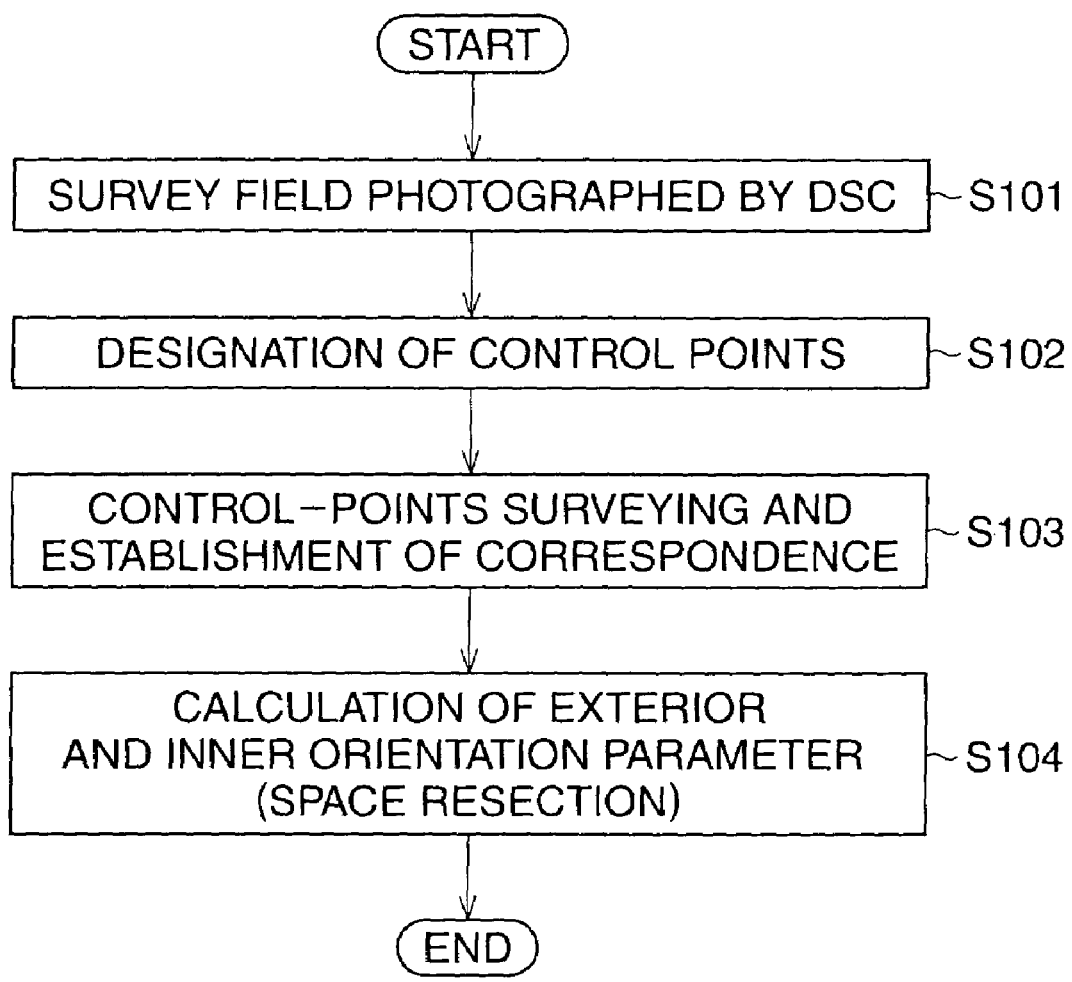
FIG. 2 is a flowchart of the survey operation processes in the surveying system.
Figure 3:
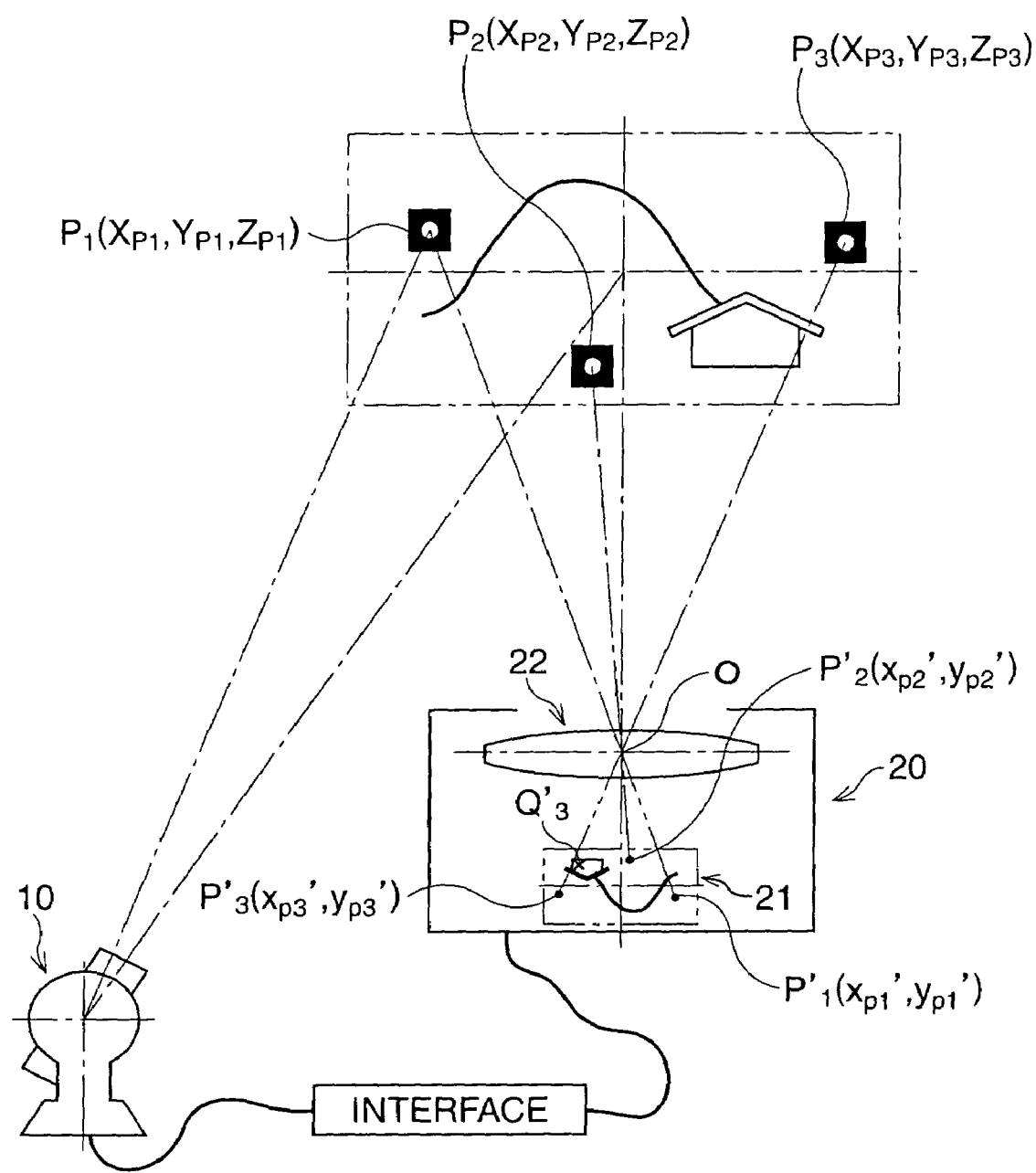
FIG. 3 schematically illustrates an arrangement of the surveying instrument and the camera.

With reference to FIG. 1, FIG. 2, and FIG. 3, a single photograph orientation process in the surveying system of the present embodiment will be described. FIG. 2 is a flowchart of the single photograph orientation process in the surveying system of the present embodiment. FIG. 3 schematically illustrates an arrangement of the surveying instrument and the camera in the surveying system of the present embodiment.

In Step 101, an operator takes a picture or image around the surveying area with the digital still camera (DSC) 20. Further, the obtained digital image data are transmitted to the computer 40 via the interface cable, and then stored in the recording medium 42. Note that, a plurality of measurement points, which are to be measured, is included within the above captured digital image (referred to as a schematic image) taken by the digital still camera 20.

In Step 102, the schematic image is indicated on the display 45 of the computer 40, for example. At this time a plurality of points (or pixels) on the schematic image are selected by the operator by using a pointing device such as a mouse 43. Thereby, substantial points in the substantial or object space, which correspond to the selected pixels, are designated as control points $P_i$ (i=1, 2, ..., n), where a control point is a measurement point that is arbitrarily selected for calculating the orientation of a schematic image. Further, the positions of image points $P_i'$ that correspond to each of the control points $P_i$ are derived as two-dimensional image coordinates $(xp_i', yp_i')$. Note that, the image coordinate system is a two-dimensional coordinate system of which the origin is at the upper left corner of the image with the y'-axis being positive in the downward direction. Further, the number "n" of control points which are three dimensionally arranged, may be more than 11.

In Step S103, an oblique distance and the angles (such as vertical and horizontal angle) of each control point $P_i$, which are appointed in Step S102, are measured by an operator by using the survey instrument 10. Measured values are then fed to the interface circuit 46 of the computer 40 via the interface circuit 16. At the CPU 41, three-dimensional coordinates $(Xp_i, Yp_i, Zp_i)$ for each of the control points $P_i$ are calculated in a predetermined surveying coordinate system. At this time, the correspondence between the surveying coordinates $(Xp_i, Yp_i, Zp_i)$ for each of the control points $P_i$ and the image coordinates $(xp_i', yp_i')$ for image points $P_i'$ is determined. Note that, the origin of the surveying coordinate system may be taken at the sighting origin $O_S$ of the surveying instrument 10, and the absolute coordinates, including latitude and longitude or any type of positioning format defined by the relevant surveying authority, may be adapted to the above survey coordinates. Further, the surveying coordinates calculation may be carried out in the surveying instrument 10, and later the calculated data may be sent to the computer 40.

As will be explained in detail later, exterior orientation parameters for the digital still camera 20, which represent the position and the inclination of the camera 20 at the moment when the schematic image was taken, are calculated in Step S104, in accordance with the correspondence between the surveying coordinates and the image coordinates for each of the control points $P_i$, by means of space resection. Further, inner orientation parameters for compensating for aberrations from the collinear condition due to lens distortion or displacement of the principal point from the image center, may be calculated. Namely, the position or the surveying coordinates $(X_O, Y_O, Z_O)$ of the origin $O_C$ of the three-dimensional camera coordinate system, which is fixed in the digital still camera 20, and the rotational angle $(\omega, \phi, \kappa)$ about the x-axis, y-axis, and z-axis of the camera coordinate system, at the time, are derived as exterior orientation parameters. Further, the inner orientation parameters (f: distance from the center of projection for the lens or the principal distance; $D_2, D_4, D_6$: second, fourth, and sixth order components of the distortion; $N_1,N_2$: unsymmetrical components of distortion; $X_C,Y_C$: displacement of the principal point from the center of the image) are obtained. Thereby, the perspective projection relationship between the image coordinates and the surveying coordinates is established. Note that, when the inner orientation parameters are definite for the above $(f,D_2,D_4,D_6,N_1,N_2,X_C,Y_C)$, the number of control points required for calculating the exterior and inner orientation parameters is at least seven. Among these control points, at least three are required to calculate the exterior orientation parameters $(X_O,Y_O,Z_O,\omega,\phi,\kappa)$ Note that, in the present embodiment, eleven (or more) control points are required to calculate the exterior and inner orientations.

Note that, the camera coordinate system is a left-handed coordinate system of which the origin $O_C$ is located at the center of the lens or the center of the projection, and in which the y-axis and z-axis are parallel to each of the s'-axis and t'-axis of the screen coordinate system. Further, the x-axis of the camera coordinate system is normal to the imaging surface and is oriented to the side opposite to the imaging surface from the center of the projection. Namely, any point on the imaging surface is represented by the camera coordinates (−f,y,z). Here, the screen coordinate system is a two-dimensional coordinate system of which the origin is defined at the principal point with each of the s'-axis and t'-axis arranged in parallel with each of the x'-axis and y'-axis, that is, in parallel with each of the horizontal and vertical lines of the imaging device 21 (see FIG. 4).

As described above, the single photograph orientation process of the present embodiment ends. Note that, the image capturing operation in Step S101 can be excluded and an image taken previously may be used as a schematic image, in place. Further, although the single photograph orientation process in the present embodiment is described with reference to the flowchart of FIG. 2, Step S103 may be carried out prior to Steps S101 and S102. Furthermore, previously measured or given measurement data, including the data for the triangulation control point, any type of map data, or geographical data, may be used as measurement information for control points.

Figure 4:
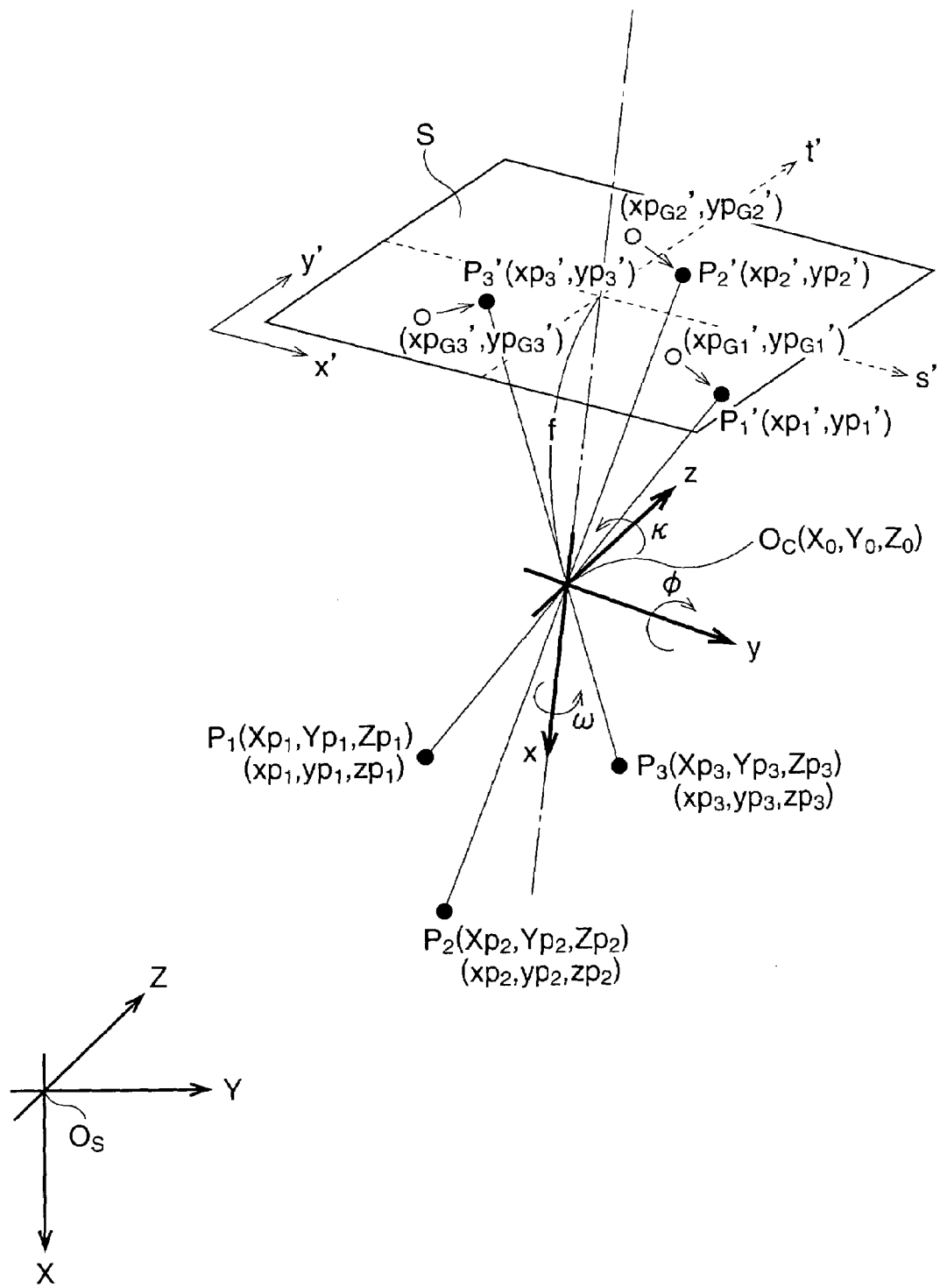
FIG. 4 schematically illustrates the relations between the control points and the corresponding image points on the imaging surface S.
Figure 5:
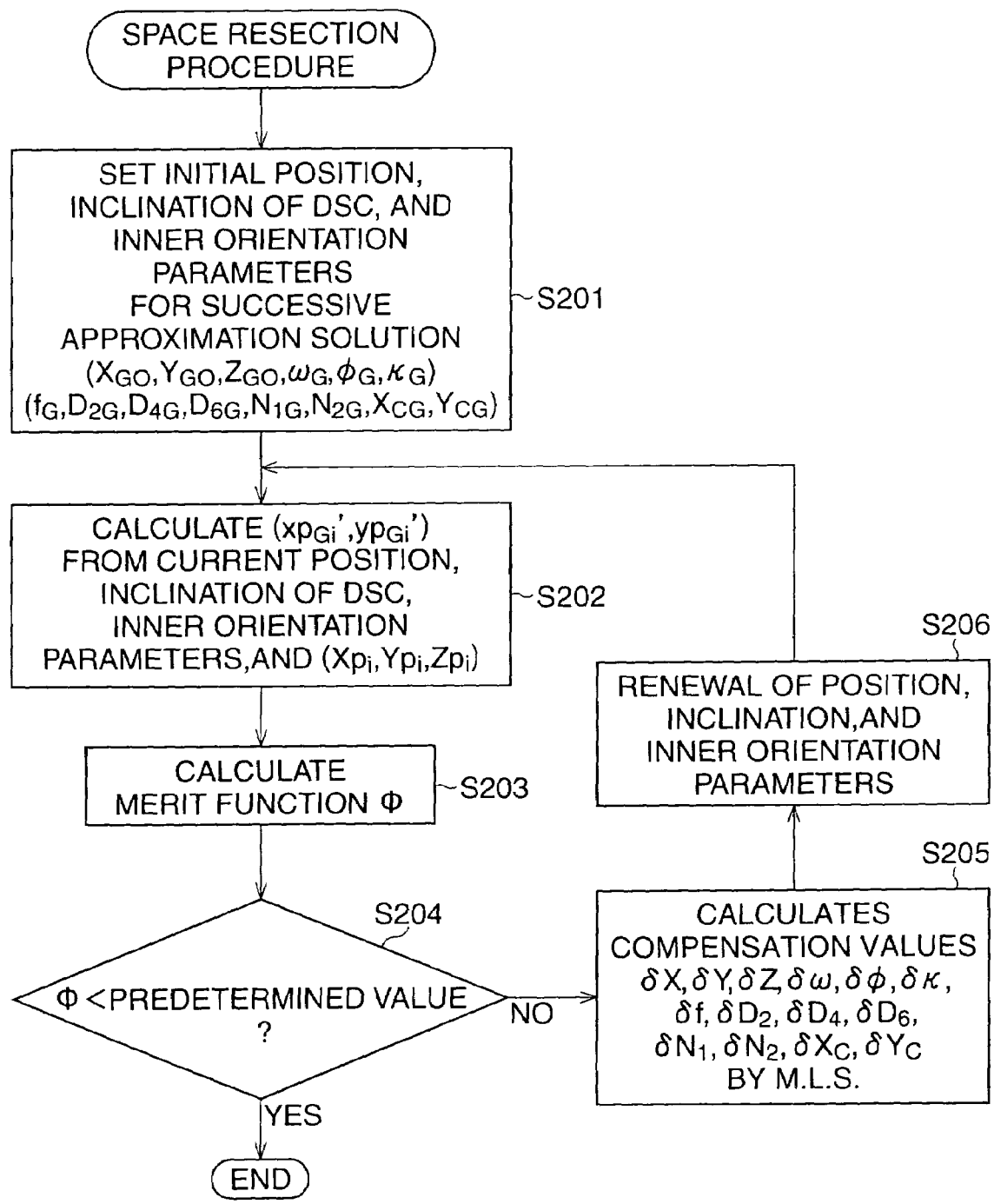
FIG. 5 is a flowchart of the space resection program that calculates exterior and inner orientation parameters.

With reference to FIG. 4 and FIG. 5, a principle for obtaining the exterior orientation parameters (position and the inclination) and the inner orientation parameters of the digital still camera 20, by space resection (Step S104), will be explained.

FIG. 4 schematically illustrates the relations between the three control points $P_1$, $P_2$, and $P_3$, and the corresponding image points $P_1'$, $P_2'$, and $P_3'$ on the imaging surface S. FIG. 5 is a flowchart of the space resection program that calculates exterior orientation parameters $(X_O,Y_O,Z_O,\omega,\phi,\kappa)$, which represent the position and the inclination of the digital still camera 20, and inner orientation parameters $(f,D_2,D_4,D_6,N_1,N_2,X_C,X_C)$ which depend on the optical system of the camera 20. For the space resection calculation, a least square method including a successive approximation solution is applied. Note that, although it is acceptable for the number of control points to be seven or more, here, a case when eleven points are designated for the control points, is explained, as an example. However, for convenience, only three control points $P_1$, $P_2$, and $P_3$ are illustrated in FIG. 4.

In Step 201, appropriate initial values $(X_{GO},Y_{GO},Z_{GO},\omega_G,\phi_G,\kappa_G)$ and $(f_G,D_{2G},D_{4G},D_{6G},N_{1G},N_{2G},X_{CG},Y_{CG})$ are given as approximate values for the exterior orientation parameters $(X_O,Y_O,Z_O,\omega,\phi,\kappa)$, representing the position and the inclination of the camera, and the inner orientation parameters $(f,D_2,D_4,D_6,N_1,N_2,X_C,Y_C)$. Then in Step S202, approximate image coordinates $(xp_{Gi}',yp_{Gi}')$ of the image point $P_i'$ (i=1,2, . . . ,11), which correspond to each of the eleven control points $P_i$, are calculated from the surveying coordinates $(Xp_i,Yp_i,Zp_i)$ of the respective control points $P_i$, by using the given exterior orientation parameters $(X_{GO},Y_{GO},Z_{GO},\omega_G,\phi_G,\kappa_G)$ and inner orientation parameters $(f_G,D_{2G},D_{4G},D_{6G},N_{1G},N_{2G},X_{CG},Y_{CG})$.

Namely, the coordinates $(xp_i,yp_i,zp_i)$ of the control points $P_i$ (i=1,2,3) in the camera coordinate system are derived from coordinates $(Xp_i,Yp_i,Zp_i)$ of the surveying coordinate system by Eq. (1), thereby, approximate camera coordinates $(xp_{Gi},yp_{Gi},zp_{Gi})$ of the control points $P_i$ are obtained by substituting the approximate exterior orientation parameters $(X_{GO},Y_{GO},Z_{GO},\omega_G,\phi_G,\kappa_G)$ and the surveying coordinates $(xp_i,yp_i,zp_i)$ of the control points $P_i$ into Eq. (1).

$$\begin{pmatrix} xp_i \\ yp_i \\ zp_i \end{pmatrix} = \begin{pmatrix} T_{11} & T_{12} & T_{13} \\ T_{21} & T_{22} & T_{23} \\ T_{31} & T_{32} & T_{33} \end{pmatrix} \begin{pmatrix} Xp_i - X_0 \\ Yp_i - Y_0 \\ Zp_i - Z_0 \end{pmatrix} \quad (1)$$

where $\{T_{jk}\}$ represents a rotational matrix, and each of the elements $T_{jk}$ are described in the following forms.

$T_{11}=\cos\phi\cdot\cos\kappa$ $T_{12}=\cos\omega\cdot\sin\kappa+\sin\omega\cdot\sin\phi\cdot\cos\kappa$ $T_{13}=\sin\omega\cdot\sin\kappa-\cos\omega\cdot\sin\phi\cdot\cos\kappa$ $T_{21}=-\cos\phi\cdot\sin\kappa$ $T_{22}=\cos\omega\cdot\cos\kappa-\sin\omega\cdot\sin\phi\cdot\sin\kappa$ $T_{23}=\sin\omega\cdot\cos\kappa+\cos\omega\cdot\sin\phi\cdot\sin\kappa$ $T_{31}=\sin\phi$ $T_{32}=-\sin\omega\cdot\cos\phi$ $T_{33}=\cos\omega\cdot\cos\phi$ The screen coordinates $(sp_i',tp_i')$ of the image point $P_i'$ corresponding to the control points $P_i$, which have not being yet been compensated by the inner orientation parameters, are derived from the collinear condition (wherein a control point, the center of projection, and the corresponding image point are aligned on the same line). Therefore, the uncompensated screen coordinates $(sp_i',tp_i')$ are calculated by substituting the exterior orientation parameters $(X_O,Y_O,Z_O,\omega,\phi,\kappa)$ and the camera coordinates $(xp_i,yp_i,zp_i)$ of control points $P_i$ into the following Eq. (2).

$$sp_i' = -f\frac{yp_i}{xp_i} = -f\frac{T_{21}(Xp_i-X_0)+T_{22}(Yp_i-Y_0)+T_{23}(Zp_i-Z_0)}{T_{11}(Xp_i-X_0)+T_{12}(Yp_i-Y_0)+T_{13}(Zp_i-Z_0)} \quad (2)$$

$$tp_i' = -f\frac{zp_i}{xp_i} = -f\frac{T_{31}(Xp_i-X_0)+T_{32}(Yp_i-Y_0)+T_{33}(Zp_i-Z_0)}{T_{11}(Xp_i-X_0)+T_{12}(Yp_i-Y_0)+T_{13}(Zp_i-Z_0)}$$

Although, the uncompensated screen coordinates $(sp_i',tp_i')$ are affected by distortion, the effect is compensated for by substituting the screen coordinates $(sp_i',tp_i')$ of each image point $P_i'$ and the approximate inner orientation parameters $(f_G,D_{2G},D_{4G},D_{6G},N_{1G},N_{2G},X_{CG},Y_{CG})$ into the following Eq. (3). Namely, compensated approximate screen coordinates $(scp_{Gi}',tcp_{Gi}')$ are obtained.

$$R^2 = sp_i'^2 + tp_i'^2$$

$$scp_i' = sp_i'(1+D_2R^2+D_4R^4+D_6R^6)+(R^2+2sp_i'^2)N_1+2sp_i'tp_i'N_2+X_C$$

$$tcp_i' = tp_i'(1+D_2R^2+D_4R^4+D_6R^6)+2sp_i'tp_i'N_1+(R^2+2tp_i'^2)N_2+Y_C \quad (3)$$

Further, approximate image coordinates $(xp_{Gi}', yp_{Gi}')$ of the image points $P_i'$ can be derived by substituting the compensated approximate screen coordinates $(scp_{Gi}', tcp_{Gi}')$ into the following Eq. (4).

$$xp_i' = scp_i'/(-Px) + W/2$$

$$yp_i' = tcp_i'/Py + H/2 \quad (4)$$

where Px and Py are the pixel pitches of the CCD or the image in the horizontal and vertical directions respectively, and W and H are the numbers of pixels in the CCD or the image, which are aligned in the horizontal and vertical directions, respectively.

In Step S203, a merit function $\Phi$ is calculated in order to determine whether the approximately given exterior orientation parameters $(X_{GO}, Y_{GO}, Z_{GO}, \omega_G, \phi_G, \kappa_G)$ and inner orientation parameters $(f_G, D_{2G}, D_{4G}, D_{6G}, N_{1G}, N_{2G}, X_{CG}, Y_{CG})$ are appropriate. For example, the merit function $\Phi$ is determined by the following Eq. (5).

$$\Phi = \sum_{i=1}^{11} \{(xp_i' - xp_{Gi}')^2 + (yp_i' - yp_{Gi}')^2\} \quad (5)$$

Namely, in the present embodiment, the merit function $\Phi$ corresponds to the total amount of squared distances between the image coordinates $(xp_i', yp_i')$ of image points $P_i'$ corresponding to the control points $P_i$ (which are selected in the schematic image), and the approximate image coordinates $(xp_{Gi}', yp_{Gi}')$ of the image points $P_i'$ calculated from the surveying coordinates $(Xp_i, Yp_i, Zp_i)$ of the control points $P_i$, the approximately given exterior orientation parameters $(X_{GO}, Y_{GO}, Z_{GO}, \omega_G, \phi_G, \kappa_G)$ and inner orientation parameters $(f_G, D_{2G}, D_{4G}, D_{6G}, N_{1G}, N_{2G}, X_{CG}, Y_{CG})$.

Then, whether the merit function is smaller than a predetermined value is determined, in Step S204. That is, whether the approximate image coordinates $(xp_{Gi}', yp_{Gi}')$ of the image points $P_i'$, which are obtained from the approximately given exterior orientation parameters $(X_{GO}, Y_{GO}, Z_{GO}, \omega_G, \phi_G, \kappa_G)$ and inner orientation parameters $(f_G, D_{2G}, D_{4G}, D_{6G}, N_{1G}, N_{2G}, X_{CG}, Y_{CG})$, are sufficiently close to the image coordinates $(xp_i', yp_i')$ of the image points $P_i'$ corresponding to the control points $P_i$, which are designated on the schematic image, is determined. When the value $\Phi$ is smaller than the predetermined value, this process is terminated and the values of the presently given exterior orientation parameters $(X_{GO}, Y_{GO}, Z_{GO}, \omega_G, \phi_G, \kappa_G)$ and inner orientation parameters $(f_G, D_{2G}, D_{4G}, D_{6G}, N_{1G}, N_{2G}, X_{CG}, Y_{CG})$ are determined as the exterior and inner orientation parameters that represent the exterior orientation parameters (which indicate position and the inclination of the camera) and inner orientation parameters when the schematic image was captured.

On the other hand, when the value of $\Phi$ is determined to be larger or equal to the predetermined value, in Step S204, then in step S205, compensation values $(\delta X, \delta Y, \delta Z, \delta\omega, \delta\phi, \delta\kappa, \delta f, \delta D_2, \delta D_4, \delta D_6, \delta N_1, \delta N_2, \delta X_C, \delta Y_C)$ for the approximately given exterior orientation parameters $(X_{GO}, Y_{GO}, Z_{GO}, \omega_G, \phi_G, \kappa_G)$ and inner orientation parameters $(f_G, D_{2G}, D_{4G}, D_{6G}, N_{1G}, N_{2G}, X_{CG}, Y_{CG})$ are calculated by using the least squares method, for example. Namely, $(scp_i', tcp_i')$ of Eq. (3) are substituted for $(sp_i', tp_i')$ of Eq. (2), which represents the collinearity condition. Eq. (2) is then subjected to Taylor's expansion at the approximate exterior orientation parameters $(X_{GO}, Y_{GO}, Z_{GO}, \omega_G, \phi_G, \kappa_G)$ and inner orientation parameters $(f_G, D_{2G}, D_{4G}, D_{6G}, N_{1G}, N_{2G}, X_{CG}, Y_{CG})$ and the higher order terms are neglected so as to linearize the formula. Accordingly, the normal equations, for which the compensation values $(\delta X, \delta Y, \delta Z, \delta\omega, \delta\phi, \delta\kappa)$ and $(\delta f, \delta D_2, \delta D_4, \delta D_6, \delta N_1, \delta N_2, \delta X_C, \delta Y_C)$ are regarded as unknown values, are derived in order to obtain the appropriate compensation values $(\delta X, \delta Y, \delta Z, \delta\omega, \delta\phi, \delta\kappa)$ and $(\delta f, \delta D_2, \delta D_4, \delta D_6, \delta N_1, \delta N_2, \delta X_C, \delta Y_C)$.

In Step S206, the approximate exterior orientation parameters $(X_{GO}, Y_{GO}, Z_{GO}, \omega_G, \phi_G, \kappa_G)$ and inner orientation parameters $(f_G, D_{2G}, D_{4G}, D_{6G}, N_{1G}, N_{2G}, X_{CG}, Y_{CG})$ are altered by the compensation values $(\delta X, \delta Y, \delta Z, \delta\omega, \delta\phi, \delta\kappa)$ and $(\delta f, \delta D_2, \delta D_4, \delta D_6, \delta N_1, \delta N_2, \delta X_C, \delta Y_C)$ which are obtained in Step S205. That is, each of the values $(X_{GO}, Y_{GO}, Z_{GO}, \omega_G, \phi_G, \kappa_G)$ and $(f_G, D_{2G}, D_{4G}, D_{6G}, N_{1G}, N_{2G}, X_{CG}, Y_{CG})$ is replaced by the values $(X_{GO}+\delta X, Y_{GO}+\delta Y, Z_{GO}+\delta Z, \omega_G+\delta\omega, \phi_G+\delta\phi, \kappa_G+\delta\kappa)$ and $(f_G+\delta f, D_{2G}+\delta D_2, D_{4G}+\delta D_4, D_{6G}+\delta D_6, N_{1G}+\delta N_1, N_{2G}+\delta N_2, X_{CG}+\delta X_C, Y_{CG}+\delta Y_C)$ to thereby renew or compensate the position, inclination, and inner orientation parameters of the camera. Then the process returns to Step S202, so that Steps S202 through S206 are repeated until the value $\Phi$ is determined to be smaller than the predetermined value in Step S204.

Figure 6:
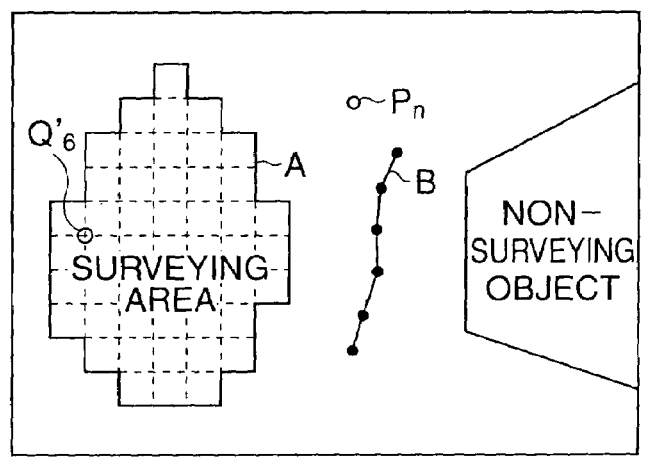
FIG. 6 schematically illustrates an example of the schematic image indicated on the display.
Figure 7:
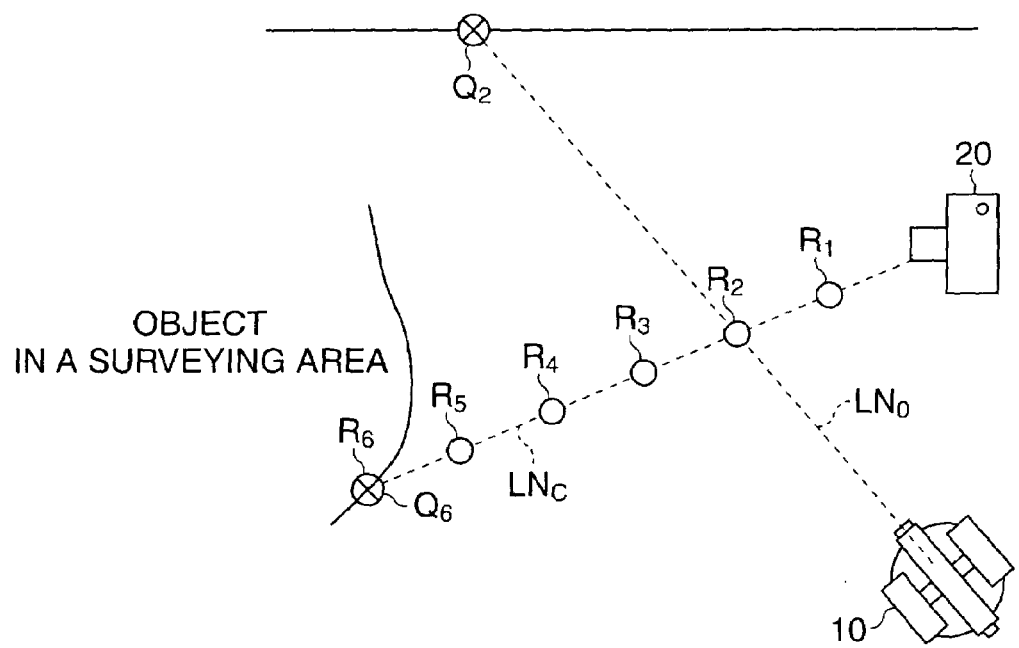
FIG. 7 schematically illustrates the principle of an automatic surveying operation in the present embodiment.

With reference to FIG. 1, FIG. 6, and FIG. 7, the automatic surveying operation using the surveying system of the present embodiment will be explained.

FIG. 6 schematically illustrates an example of the schematic image indicated on the display 45. An operator operates the mouse 43 and controls a mouse cursor on the schematic image in order to define an area (a surveying area) "A" that is to be surveyed. The computer 40 obtains a collinear line $LN_C$ that satisfies the collinear condition of an arbitrary pixel within the surveying area "A" (e.g. the image point $Q_6'$ corresponding to an object point $Q_6$), as shown in FIG. 7. The surveying instrument 10 scans along the collinear line $LN_C$ (which is carried out by moving the collimation axis $LN_O$ of the surveying instrument along the collinear line $LN_C$ under the condition that the collimation axis $LN_O$ intersects the collinear line $LN_C$) and obtains measurement data at a predetermined interval (e.g. points $R_1$–$R_5$) in accordance with signals from the computer 40, so that the object point $Q_6$ is searched with reference to the measurement coordinate values obtained when sighting the surveying instrument 10 to each of the points $R_j$ (j=1,2, . . . ,6). This operation may be carried out for all pixels within the surveying area "A". Further, the surveying area "A" may be automatically divided into arbitrarily distanced grids (e.g. regular intervals) and the scanning operation may be carried out only for each of the nodal points on the grids. Further, a curvature line "B" (or a segment) can also be defined and they may be automatically divided into arbitrary intervals (e.g. regular intervals). In the present embodiment, both a surveying area "A" and a curvature line "B" are determined by an operator. An area or a line may also be divided with respect to regular angular intervals for a surveying instrument. Further, a surveying area "A" and a curvature line "B" can be defined automatically by an image processing executed on the schematic image. For example, an area and line may be detected with respect to an arbitrary color or luminance, or by using an edge enhancing process.

When the surveying instrument 10 is sighted to the point $R_2$ on the collinear line $LN_C$, a position which is measured is the object point $Q_2$ which is outside the surveying area "A". The image coordinates $(x_{q2}', y_{q2}')$ on the schematic image, which corresponds to the object point $Q_2$, is calculated by substituting the exterior orientation parameters $(X_O, Y_O, Z_O, \omega, \phi, \kappa)$ and the inner orientation parameters $(f, D_2, D_4, D_6, N_1, N_2, X_C, X_C)$ of which the values are obtained by the single photograph orientation process, and the surveying coordinates $(X_{q2}, Y_{q2}, Z_{q2})$ of the object point $Q_2$, into Eq. (1) through Eq. (4). However, the image coordinates $(x_{q2}', y_{q2}')$ which correspond to the measured object point $Q_2$ are different from the image coordinates $(x_{q6}', y_{q6}')$ of the designated image point $Q_6'$ since the object point $Q_2$ is not equal to the object point $Q_6$ which corresponds to the designated image point $Q_6'$.

On the other hand, the point $R_6$ on the collinear line $LN_C$ coincides with the object point $Q_6$ where the collinear line $LN_C$ intersects with a subject within the surveying area "A". Namely, image coordinates calculated from surveying coordinates that are obtained when the surveying instrument 10 is sighted to the point $R_6$, coincide with the image coordinates $(x_{q6}', y_{q6}')$ of the designated image point $Q_6'$. Consequently, automatic measurement for an object point that corresponds to an arbitrarily designated pixel on the schematic image can be achieved by carrying out surveying along a collinear line corresponding to the arbitrarily designated pixel (a pixel within the surveying area "A" in the present embodiment), and searching for an object point of which the image coordinates obtained from its surveying coordinates substantially coincide with the image coordinates of the arbitrarily designated pixel.

With reference to FIG. 8 to FIG. 11, the automatic surveying operation of the present embodiment will be explained in detail.

Figure 8:
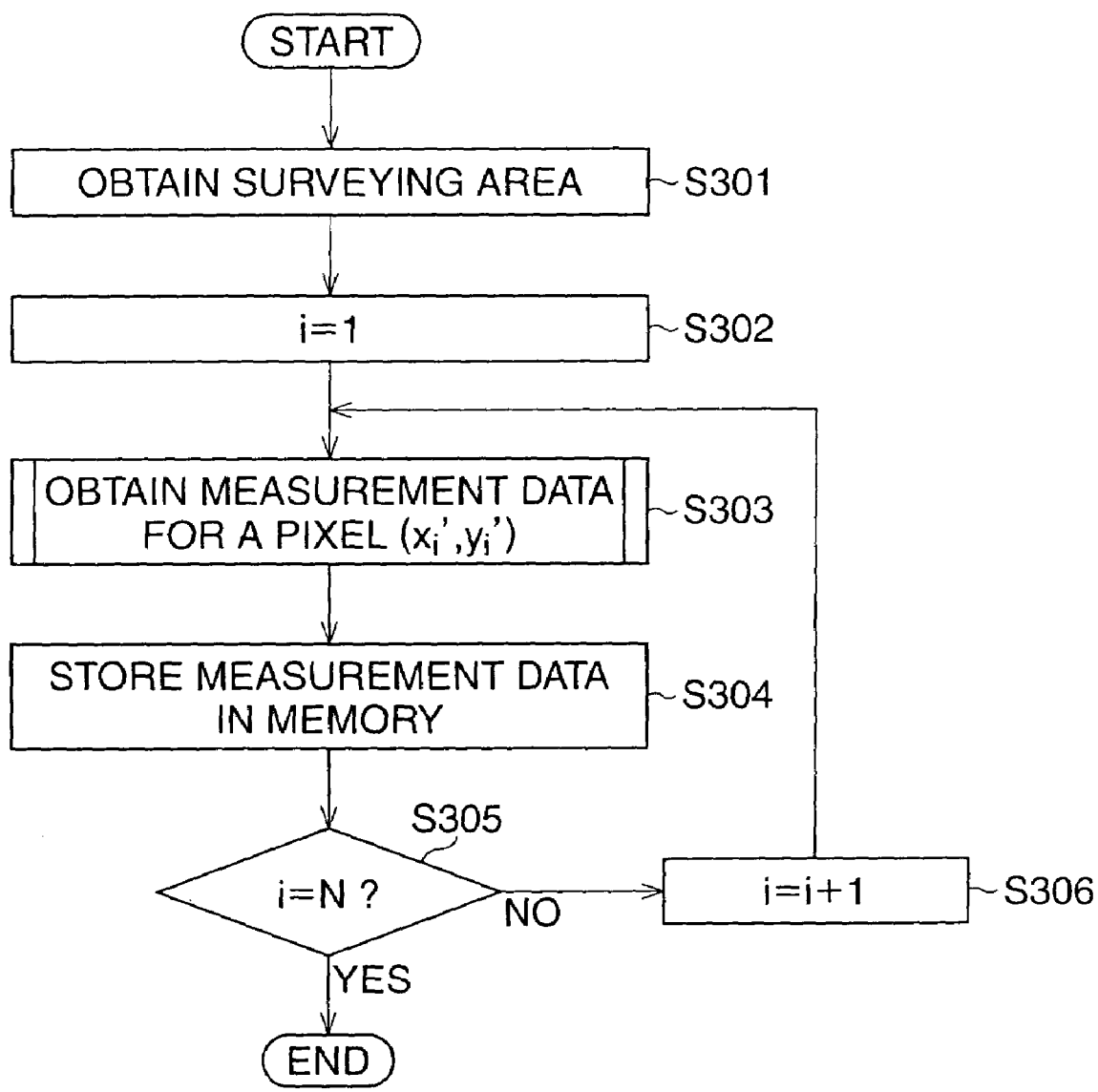
FIG. 8 is a flowchart of the automatic surveying operation in the present embodiment.

FIG. 8 is a flowchart of the automatic surveying operation program. The program is executed in the CPU 41. The automatic surveying operation of FIG. 8 is carried out after the completion of the single photograph orientation process for the schematic image. Therefore, the exterior and inner orientation parameters for the digital still camera 20, when the schematic image was taken, have already been obtained. In Step S301, the surveying area "A", which is defined by an operator on the schematic image on the monitor 45 by using the mouse 43, is received. Further, all pixels within the surveying area "A" are numbered (1 to N, where "N" is the total number of pixels inside the surveying area "A").

In Step S302, "1" is set for a pixel number "i", so that Step S303 through Step S306 are repeated until "i" reaches "N". In Step S303, surveying along the collinear line that corresponds to the image coordinates $(x_i', y_i')$ of a pixel number "i" is automatically carried out. Namely, the position of an object point that corresponds to the pixel with the pixel number "i" is searched and measured by comparison between the image coordinates corresponding to measured surveying coordinates and the image coordinates $(x_i', y_i')$ of the pixel with the pixel number "i" (object point searching process). Note that, the detail of the object point searching process will be explained latter.

In Step S304, the measurement data of the image coordinates $(x_i', y_i')$ obtained by the object point searching process of Step S303 is recorded in the recording medium 42. In Step S305, whether the pixel number "i" is larger than the total pixel number "N" is determined. Namely, whether the object point searching process has been carried out for all pixels inside the surveying area "A" is determined. When it is determined that it has not, i.e. i≠N, the number "i" is incremented by one in Step S306 and the process returns to Step S303. On the other hand, when it is determined that i=N, this automatic surveying operation ends.

Figure 9:
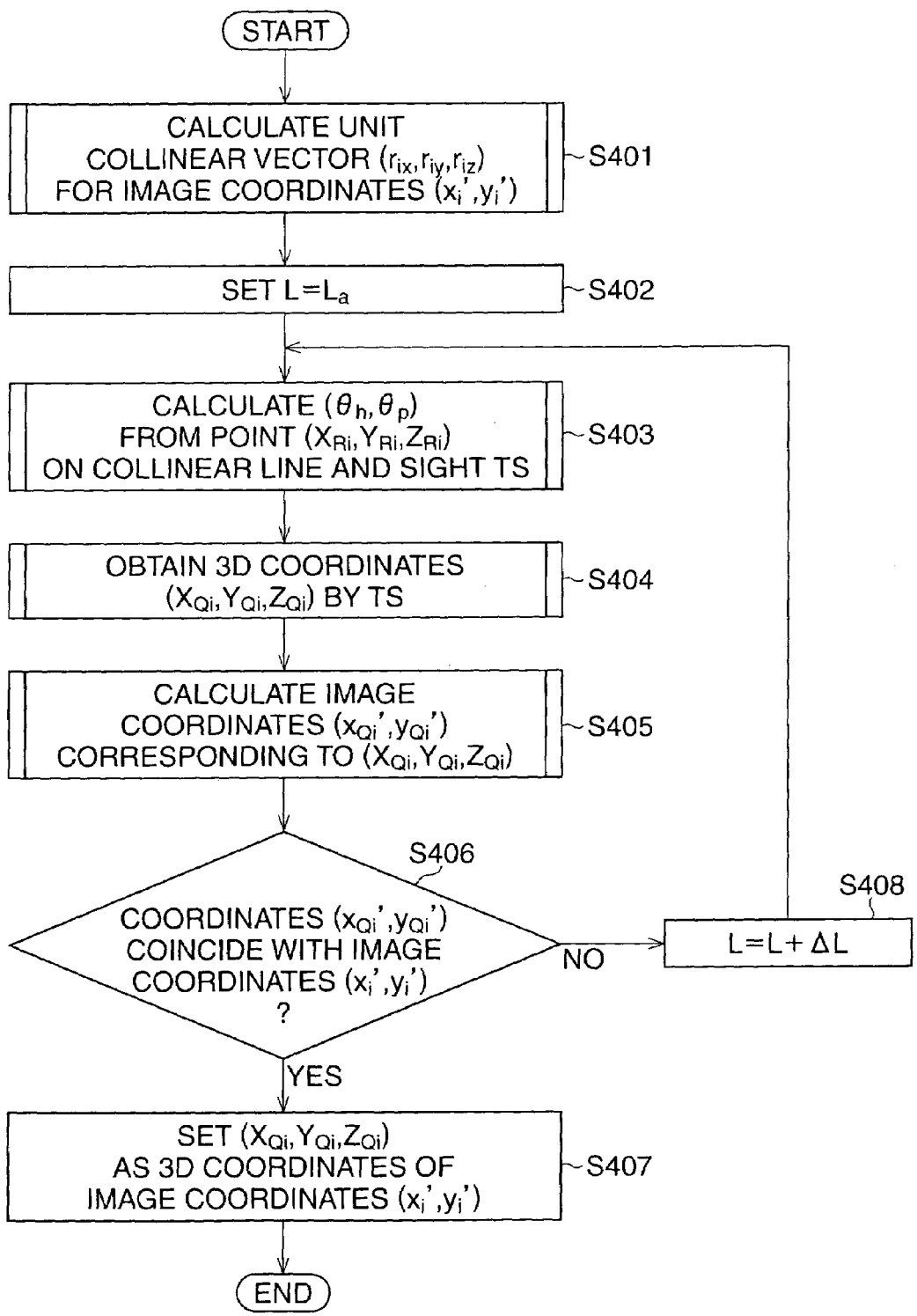
FIG. 9 is a flowchart of an object point searching process which is carried out in Step S303 of FIG. 8.

FIG. 9 is a flowchart of the object point searching process that is executed in Step S303. In Step S401, a unit collinear vector $(r_{ix}, r_{iy}, r_{iz})$ for the collinear line $LN_C$ of the image coordinates $(x_i', y_i')$ is calculated (unit collinear vector calculating process). In the object point searching process, the surveying is carried out by sighting the surveying instrument 10 to hypothetical sighting points $R_j$ which are arranged on the collinear line $LN_C$ at predetermined intervals. In Step S402, the distance "L" from the origin $O_C$ $(X_O, Y_O, Z_O)$ of the camera coordinate system to a hypothetical sighting points $R_j$ on the collinear line $LN_C$ is set to the initial distance $L_a$.

In Step S403, the surveying coordinates $(X_{Rj}, Y_{Rj}, Z_{Rj})$ of the hypothetical sighting points $R_j$ are calculated from the unit collinear vector $(r_{ix}, r_{iy}, r_{iz})$, which is obtained in Step S401, and the distance "L", as follows.

$$X_{Rj} = X_O + r_{ix} \times L$$

$$Y_{Rj} = Y_O + r_{iy} \times L$$

$$Z_{Rj} = Z_O + r_{iz} \times L \quad (6)$$

Further, the horizontal angle $\theta h$ and the altitude $\theta p$ for sighing the sighting telescope 17 to the hypothetical sighting point $R_j$ are obtained by Eq. (7) and Eq. (8).

$$\theta h = \begin{cases} \sin^{-1}\left(\dfrac{\frac{Y_{Ri}}{\sqrt{X_{Ri}^2+Y_{Ri}^2+Z_{Ri}^2}}}{\cos\left(\sin^{-1}\dfrac{Z_{Ri}}{\sqrt{X_{Ri}^2+Y_{Ri}^2+Z_{Ri}^2}}\right)}\right) & (X_{Ri} \geq 0) \\ \pi - \sin^{-1}\left(\dfrac{\frac{Y_{Ri}}{\sqrt{X_{Ri}^2+Y_{Ri}^2+Z_{Ri}^2}}}{\cos\left(\sin^{-1}\dfrac{Z_{Ri}}{\sqrt{X_{Ri}^2+Y_{Ri}^2+Z_{Ri}^2}}\right)}\right) & (X_{Ri} < 0) \end{cases} \quad (7)$$

$$\theta p = \sin^{-1}\left(\dfrac{Z_{Ri}}{\sqrt{X_{Ri}^2+Y_{Ri}^2+Z_{Ri}^2}}\right) \quad (8)$$

Figure 10:
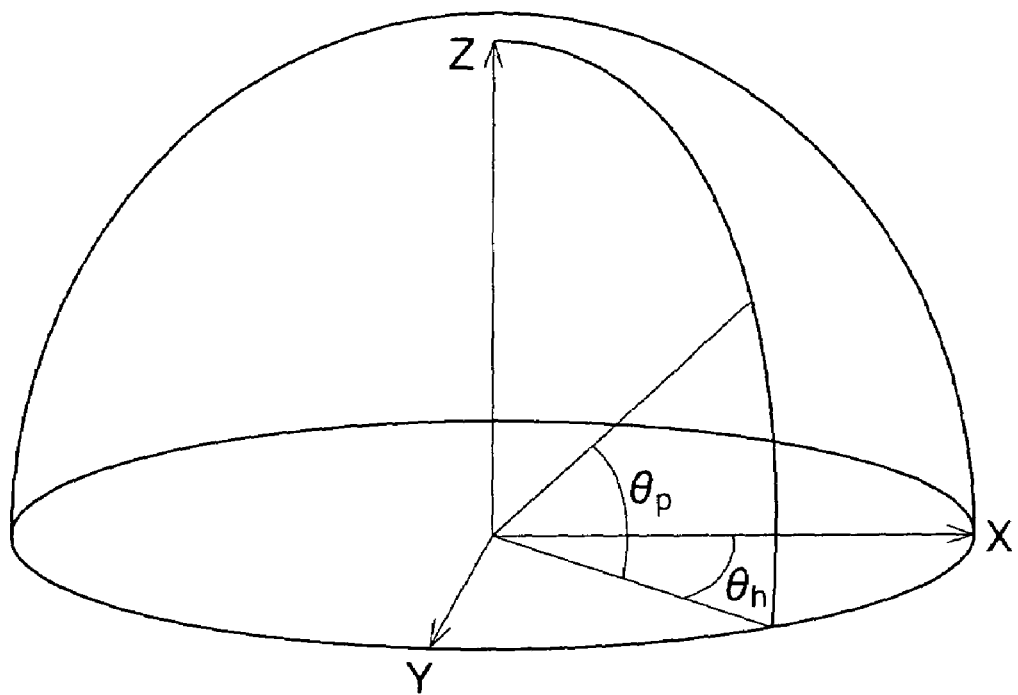
FIG. 10 schematically illustrates the relation between the sighting telescope of the surveying instrument and the surveying coordinates.

Note that, as described in FIG. 10, the origin of the surveying coordinates system is positioned at the sighting origin OS in Eq. (7) and Eq. (8). When $\theta p = \theta h$, the X-axis coincides with the horizontal axis Lh, the Y-axis coincides with the vertical axis Lp, and the Z-axis coincides with the collimation axis (optical axis) $LN_O$. Further, at this time, the surveying instrument 10 orients the collimation axis (optical axis) $LN_O$ of the sighting telescope 17 to $(\theta h, \theta p)$ in accordance with signals from the computer 40.

In Step S404, the measurement or surveying is carried out for the direction which is sighted in Step S403. According to the above measurement, the surveying coordinates $(X_{Qi}, Y_{Qi}, Z_{Qi})$ for the object point $Q_i$ is calculated from the substantial measurement data for the object point $Q_i$ which corresponds to the hypothetical sighting point $R_i$. The image coordinates $(x_{Qi}', y_{Qi}')$ which correspond to the surveying coordinates $(X_{Qi}, Y_{Qi}, Z_{Qi})$ of the object point $Q_i$ are then calculated from the exterior orientation parameters $(X_O, Y_O, Z_O, \omega, \phi, \kappa)$ and the inner orientation parameters $(f, D_2, D_4, D_6, N_1, N_2, X_C, X_C)$, in Step S405.

In Step S406, whether the image coordinates $(x_{Qi}, y_{Qi})$ of the object point $Q_i$ coincide with the image coordinates $(x_i', y_i')$ of the collinear line $LN_C$ is determined. For example, when the distance between the image coordinates $(x_{Qi}', y_{Qi}')$ and the image coordinates $(x_i', y_i')$ is within a predetermined value, it is determined that the coordinates $(x_{Qi}', y_{Qi}')$ of the object point Qi coincide with the image coordinates $(x_i', y_i')$ of the collinear line $LN_C$. In this situation, the surveying coordinates $(X_{Qi}, Y_{Qi}, Z_{Qi})$ of the object point $Q_i$, which are calculated in Step S407, are defined as the surveying coordinates of the pixel $(x_i', y_i')$ that corresponds to the pixel number "i". Accordingly, the object point searching process for the pixel number "i" ends. On the other hand, when it is determined that the above two sets of coordinates do not coincide, the distance "L" is replaced by "L+ΔL" in Step S408, and the processes from Step S403 are repeated. Note that, "ΔL" is an increment for the distance "L" and defined by regarding the required precision and the surveying time.

Figure 11:
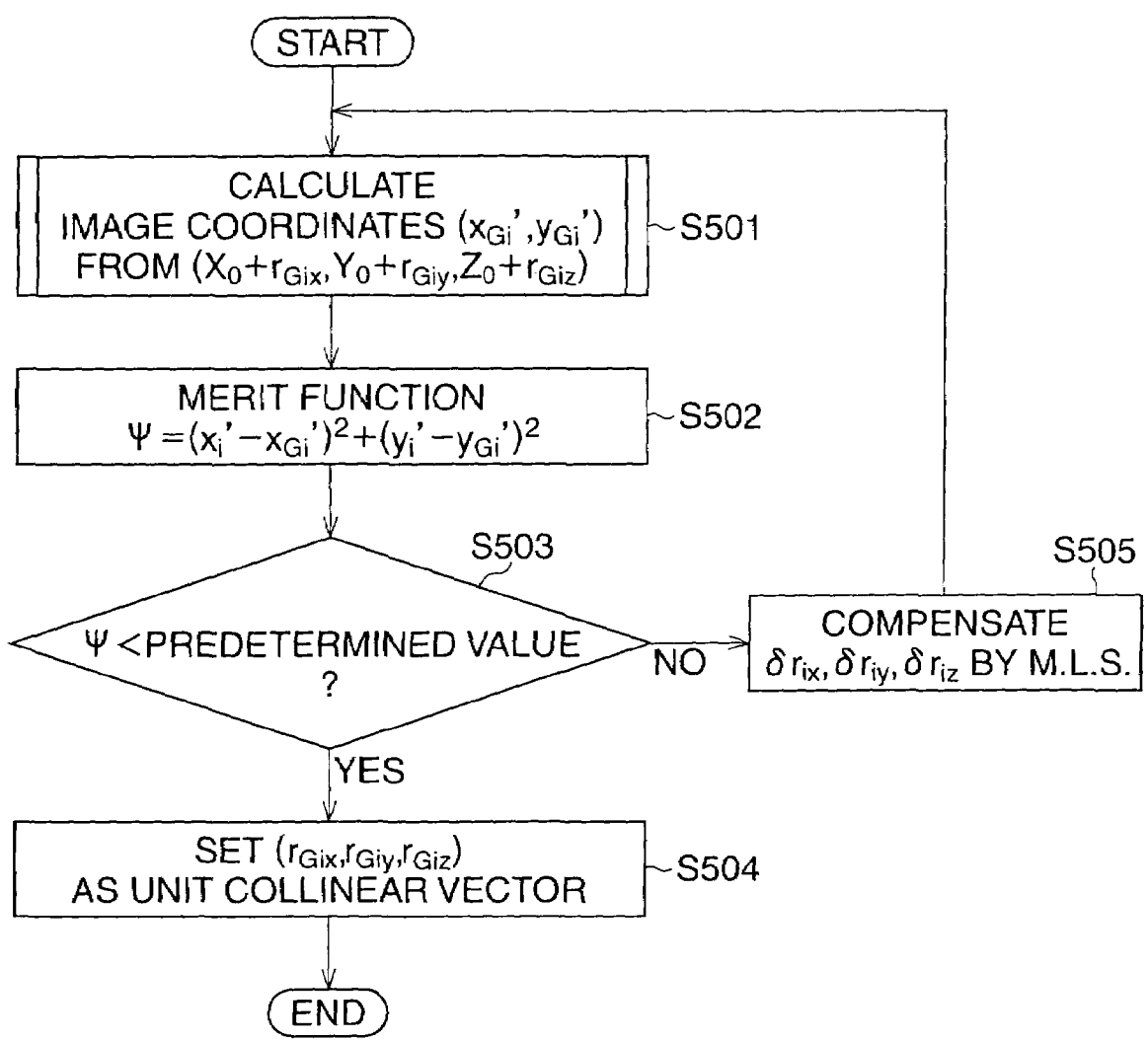
FIG. 11 is a flowchart of the unit collinear vector calculating process.

Next, with reference to FIG. 11, the unit collinear vector calculating process that is carried out in Step S401 is explained. FIG. 11 is a flowchart of the unit collinear vector calculating process.

In the present embodiment, a unit collinear vector is calculated by means of the least square method. Namely, in the unit collinear vector calculating process of the present embodiment, an arbitrary unit vector $(r_{Gix}, r_{Giy}, r_{Giz})$ is given as an approximate unit collinear vector for a pixel $(x_i', y_i')$, in the first step. Therefore in Step S501, the image coordinates $(x_{Gi}', y_{Gi}')$ for the surveying coordinates $(X_O + r_{Gix}, Y_O + r_{Giy}, Z_O + r_{Giz})$ that correspond to the end of the unit vector $(r_{Gix}, r_{Giy}, r_{Giz})$ which extends from the origin $O_C$: $(X_O, Y_O, Z_O)$ of the camera coordinates system, are calculated using Eq. (1) to Eq. (4) with respect to the exterior orientation parameters $(X_O, Y_O, Z_O, \omega, \phi, \kappa)$ and the inner orientation parameters $(f, D_2, D_4, D_6, N_1, N_2, X_C, X_C)$.

In Step S502, a merit function $\Psi = (x_i' - x_{Gi}')^2 + (y_i' - y_{Gi}')^2$ is calculated for the image coordinates $(x_{Gi}', y_{Gi}')$ obtained in Step S501. Whether the merit function $\Psi$ is smaller than a predetermined value is determined in Step S503. When it is determined that the merit function $\Psi$ is smaller than the predetermined value, the unit vector $(r_{Gix}, r_{Giy}, r_{Giz})$ is defined as the unit collinear vector $(r_{ix}, r_{iy}, r_{iz})$ of the pixel that corresponds to the pixel number "i", in Step S504, so that this unit collinear vector calculating process for the pixel number "i" ends.

On the other hand, when it is determined in Step S503 that the merit function $\Psi$ is not smaller than the predetermined value, compensation values $(\delta r_{ix}, \delta r_{iy}, \delta r_{iz})$ for the approximate unit vector $(r_{Gix}, r_{Giy}, r_{Giz})$ are calculated by means of the least square method, in Step S505. Further, the approximate unit vector is replaced by a new unit vector $(r_{Gix} + \delta r_{ix}, r_{Giy} + \delta r_{iy}, r_{Giz} + \delta r_{iz})$. The process then returns to Step S501, so that Step S501 to Step S505 are repeated until the merit function $\Psi$ is determined to be smaller than the predetermined value, in Step S503.

Note that, the volume of the surveying area is calculated from the measurement data of the surveying area, which is obtained from the above automatic surveying operation. Further, the area, the circumferential length, or the like, which relates to the surveying area can also be calculated by surveying only the circumference of the designated surveying area.

As described above, according to the present embodiment, a measurement point which is designated on a schematic image can be automatically sighted by a surveying instrument, so that the measurement point can be automatically measured. Further, although it is not depicted, when using a surveying instrument with a CCD provided inside, the sighting telescope can be more precisely sighted to a point by designating the point on an image captured by the CCD, which has a higher magnification than the schematic image, after rough sighting to the point. Further, according to the present embodiment, the surveying operation within a surveying area can be automatically carried out when an operator merely defines the surveying area on the schematic image, so that efficiency of the surveying operation can be greatly improved.

Note that, when using a lens system having a long focal length, such as a telephoto lens, distortion which is a part of the inner orientation parameters is sufficiently small, so that on some occasions it can be neglected. Namely, the inner orientation parameters $(D_2, D_4, D_6, N_1, N_2)$ can be neglected, so that the remaining inner orientation parameters are reduced to $(f, X_C, Y_C)$. In this case, only five control points $P_i$ which are three-dimensionally arranged are required for obtaining the inner orientation parameters $(f, X_C, Y_C)$. Further, when the displacement of the principal point from the image center, the unsymmetrical components of the distortion, and the fourth and sixth distortion components are negligible, the remaining inner orientation parameters are reduced to $(f, D_2)$, so that the number of control points required for obtaining the inner parameters is reduced to four. As described above, since the number of unknown inner orientation parameters is reduced, the number of control points is also reduced, so that labor and time for the surveying can be reduced.

In the present embodiment, the digital still camera 20 is arbitrarily disposed with respect to the surveying instrument 10, however, the digital still camera 20 may be disposed at the position which is optically equivalent to the sighting telescope 17 of the surveying instrument 10, by using a camera mounting accessory equipped on the surveying instrument 10. In this case, the number of unknown exterior orientation parameters can be reduced, so that the number of control points can be reduced. Further, when a schematic image is captured with the digital still camera 20 placed at the position which is optically equivalent to the sighting telescope 17 of the surveying instrument 10 (when the center of projection for an imaging optical system of an imaging device is placed at a position that is optically equivalent to the sighting origin of a sighting telescope), the horizontal angle and the vertical angle can be directly calculated from image coordinates, so that the process is facilitated.

In the following, an alternate embodiment when the digital still camera 20 is positioned at a point where it is optically equivalent to the sighting telescope 17 is explained with reference to FIG. 12. In this case, $X_O$, $Y_O$, and $Z_O$ are all equal to zero $(X_O = Y_O = Z_O = 0)$ for the exterior orientation parameters $(X_O, Y_O, Z_O, \omega, \phi, \kappa)$. When the y-axis and the Z-axis of the camera coordinate system are defined as to correspond to the horizontal axis Lh and the vertical Lp of the surveying instrument, respectively, the surveying coordinate system and the camera coordinate system can be regarded as having the same coordinate system. Therefore, when the surveying instrument 10 is sighted onto a measurement point $P_n$ on the schematic image (see FIG. 6), the image coordinates $(xp_n', yp_n')$ of the image point $P_n'$ for the measurement point $P_n$ can be directly obtained from the horizontal angle $\theta h_n$ and the vertical angle $\theta p_n$ of the surveying instrument 10 sighted onto the measurement point $P_n$, and principal distance f of the imaging lens by substituting them into the following equations:

$$x_{pn}'=f\tan(\theta h_n-\theta h_O)/Px+W/2,$$

$$y_{pn}'=f\tan(\theta p_n-\theta p_O)/Py+W/2 \qquad (9)$$

where $\theta h_O$ and $\theta p_O$ are initial sighting directions when the schematic image is captured (note that, when distortion compensation is necessary, the inner orientation parameters are also used). Therefore, when a sighting position (xpn', ypn') is designated on the schematic image, the horizontal angle $\theta h_n$ and the altitude $\theta p_n$ of the measurement point $P_n$ can be calculated as the inverse of Eq. (9) that is:

$$\theta h_n = \tan^{-1}(Px(xp_n'-W/2)/f)+\theta h_O$$

$$\theta p_n = \tan^{-1}(Py(yp_n'-H/2)/f)+\theta p_O. \qquad (10)$$

Therefore, the surveying instrument can be sighted in the direction represented by Eq. (10).

Figure 12:
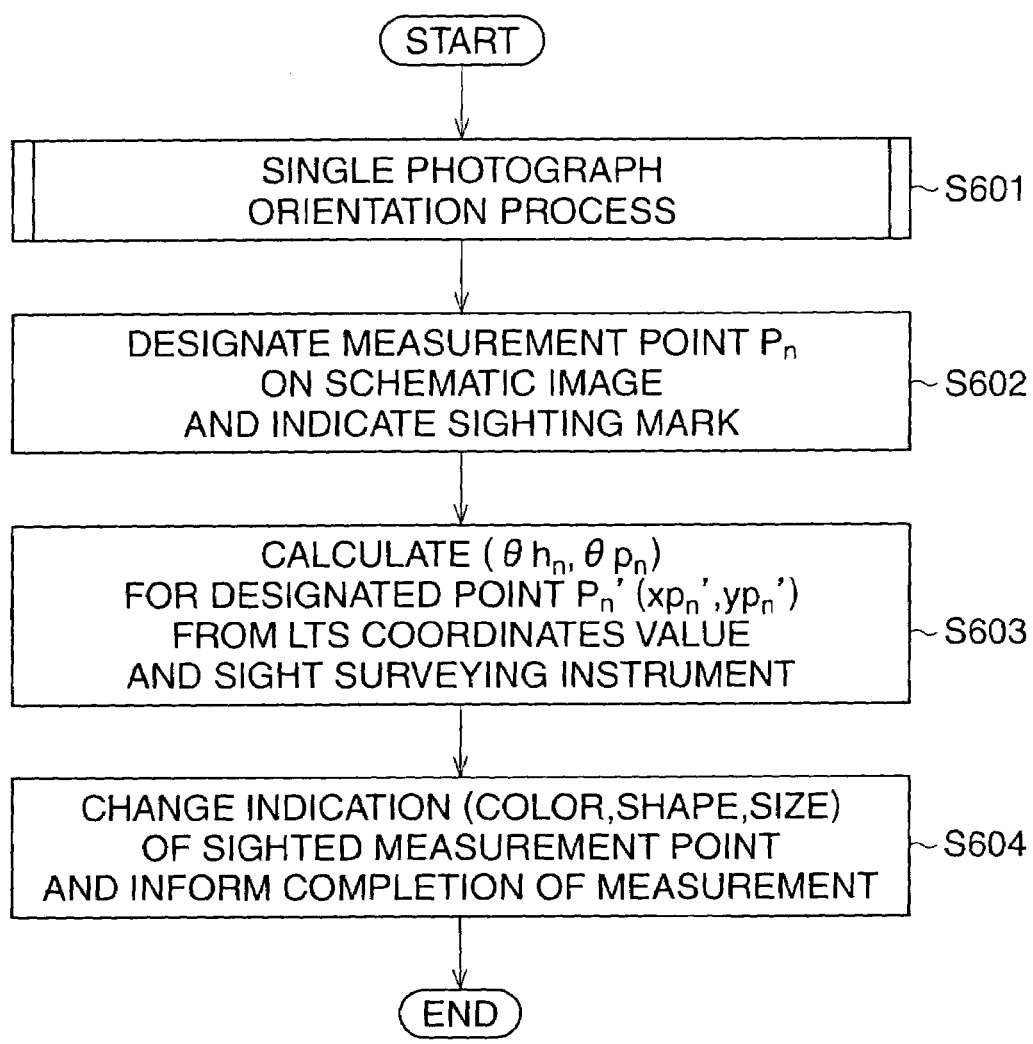
FIG. 12 is a flowchart of the surveying operation for an alternate embodiment.

FIG. 12 is a flowchart of the surveying operation for the present alternate embodiment.

In Step S601, correspondence between the schematic image and the surveying coordinates is establish based on the single photograph orientation process described in FIG. 2. In Step S602, a measurement point $P_n$ is designated on the schematic image as a sighting point by using the mouse 43 (see FIG. 6). Further, a sighting mark is indicated on the designated point to indicate the sighting position. In Step S603, the sighting angels ($\theta h_n$, $\theta p_n$) are calculated by substituting the position $P_n'(x_{pn}',y_{pn}')$ on the schematic image for the designated sighting point (measurement point $P_n$) into Eq. (10). Further, the surveying instrument is oriented in the above direction. In Step S604, the indication (color, shape, or size) of the sighting point that has already been sighted is changed and displayed on the schematic image. By this, this surveying operation ends.

According to the present alternate embodiment, an operator can visually recognize whether the sighting is finished on the schematic image, so that the efficiency of the sighting is improved.

Further, another alternate embodiment is described, wherein a surveying operation is carried out for a sighting point which has three-dimensional position information, such as when a measurement point to be sighted is given three-dimensional positional information as planning values, such as a staking point, or when sighting a measurement point has already been measured in a previous surveying. When three-dimensional information of a measurement point $P_n$ is given, the surveying instrument 10 can be automatically sighted by calculating the horizontal angle $\theta h_n$ and vertical angle $\theta p_n$ by substituting the coordinates ($X_n$, $Y_n$,$Z_n$) of the measurement point $P_n$ into $R_i$ ($X_{Ri}$,$Y_{Ri}$,$Z_{Ri}$) of Eq. (7) and Eq. (8). FIG. 13 shows a flowchart of the surveying operation in this case.

In Step S701, correspondence between the schematic image and the surveying coordinates is establish according to the single photograph orientation process described in FIG. 2. In Step S702, a measurement point (e.g. staking point) of which the three-dimensional coordinates are known is indicated on the schematic image. An operator defines a sighting direction by designating a measurement point on the schematic image, the point which is to be sighted, by using a pointing device, such as the mouse 43, in Step S703. In Step S704, the three-dimensional coordinates of the measurement point $P_n$ are substituted into Eq. (7) and Eq. (8), in order to calculate the sighting angles ($\theta h_n$,$\theta p_n$) and to sight the surveying instrument in the direction represented by the above sighting angles. In Step S705, the indication (color, shape, or size) of the measurement point which has already been sighted is altered. By this, this surveying operation ends.

According to the above alternate embodiment, a similar effect as that in the previous alternate embodiment can be obtained. Thus, the completion of the sighting can be visually confirmed on the schematic image and efficiency of the surveying operation is improved. Note that, in Step S703, a mark indicating a selected measurement point may be altered when the measurement point is designated. In the case of surveying a staking point and when the planning coordinate system for the staking point is not equivalent to the surveying coordinate system, the coordinate values of the staking point in the planning coordinate system are transformed to the surveying coordinate system. On the other hand, the inverse transformation can also be carried out.

In the present embodiments, the surveying instrument is oriented to the sighting point $R_i$ on the collinear line $LN_C$ that corresponds to an arbitrary designated pixel, and the image coordinates ($x_{Qi}'$,$y_{Qi}'$) on the schematic image are calculated from the surveying coordinates ($X_{Qi}$,$Y_{Qi}$,$Z_{Qi}$) measured in the above sighting. Further, whether the image coordinates ($x_{Qi}'$,$y_{Qi}'$) coincide with the image coordinates ($x_i'$,$y_i'$) of the arbitrarily designated pixel is determined. However, this may be determined by whether the surveying coordinates ($X_{Qi}$,$Y_{Qi}$,$Z_{Qi}$) coincide with the surveying coordinates ($X_{Ri}$,$Y_{Ri}$,$Z_{Ri}$) of the sighting point $R_i$.

Note that, although in the present embodiments, the control points are arbitrarily designated on the schematic image by using a pointing device, it is also possible to capture an image of a reference scale of which the dimensions are known, or reference marks at arbitrary positions within the schematic image, and to calculate the exterior orientation parameters by regarding them as the control points. In this case, the points on the reference scale or the reference marks may be designated on the schematic image by a pointing device or the like. Further, when the reference scale or the reference marks are applied the control points on the schematic image may be automatically detected by means of image processing.

In the present embodiments, a computer connected to a surveying instrument is used, however, the function of the computer may be integrated into the surveying instrument or a digital still camera. Further, although in the present embodiments, a digital image is obtained by a digital still camera, any type of image capturing device, such as a digital video camera and the like, can be used as long as it can finally produce a digital image.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2002-190599 (filed on Jun. 28, 2002) which is expressly incorporated herein, by reference, in its entirety.

What is claimed is:

1. An automatic surveying system, comprising:
   a surveying device;
   a collinear-line calculating processor that obtains a collinear line which satisfies a collinear condition for an arbitrarily designated point on a schematic image, the designated point having a known positional relation to said surveying device;

a sighting-direction control processor that performs a sighting-direction control process to control a sighting-direction of said surveying device to move along said collinear line;

an object point searching processor that searches for an object point, the position of said object point determinable as a point on said collinear line by measuring said sighting direction with said surveying device while performing the sighting direction control process; and wherein a position obtained by said object point searching processor coincides with an object point that corresponds to said designated point on said schematic image.

2. A system according to claim 1, further comprising a position relation calculating processor that calculates a positional relation between said surveying device and said schematic image, and wherein said positional relation is calculated from surveying information of at least three arbitrarily designated control points and the position of said control points on said schematic image.

3. A system according to claim 2, further comprising an input device that enables a designation of a point on said schematic image, and said control points are defined by designating arbitrary points on said schematic image by using said input device.

4. A system according to claim 1, further comprising an input device that enables a designation of a point on said schematic image, and a point on said schematic image, which is to be searched for in said object point searching processor, is arbitrarily designated on said schematic image by using said input device.

5. A system according to claim 4, wherein a line on said schematic image can be defined by said input device, and the object point searching process is carried out for a plurality of points included in one of said line and said curvature line.

6. A system according to claim 4, wherein a closed curve on said schematic image can be defined by said input device, and the object point searching process is carried out for a plurality of points which are surrounded by said closed curve.

7. An automatic surveying system, comprising a surveying device;

a collinear line calculator that obtains a collinear line which satisfies a collinear equation for an arbitrarily designated point on a schematic image, the designated point having a known positional relation to said surveying device;

a sighting-direction controller that performs a sighting direction control process to control a sighting-direction of said surveying device to move along said collinear line;

an object point searcher that searches for an object point, the position of said object point being determinable as a point on said collinear line by measuring a sighting direction with said surveying device while performing the sighting direction control process; and a positional relation calculating processor that calculates a positional relation between said surveying device and said schematic image and obtains a positional relationship between the designated point and the surveying device;

wherein a position obtained by said object point searcher coincides with an object point that corresponds to said designated point on said schematic image.

* * * * *